United States Patent Office 2,706,064
Patented Apr. 12, 1955

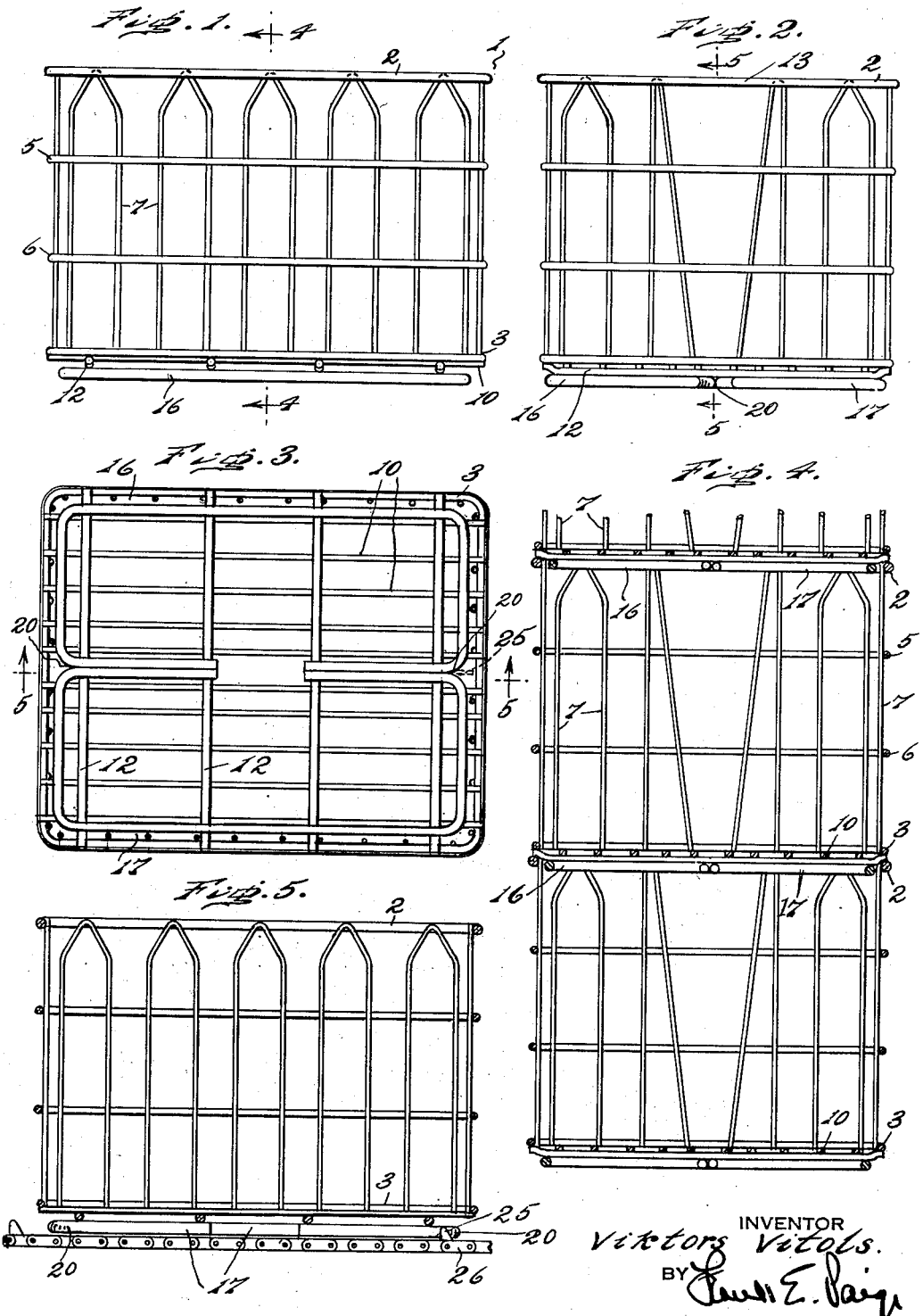

2,706,064

WIRE CRATE HAVING A STACKING MEANS

Viktors Vitols, St. Paul, Minn., assignor to John Wood Company, New York, N. Y., a corporation of Delaware Application September 13, 1954, Serial No. 455,412

4 Claims. (Cl. 220—19)

My invention relates to wire crates or containers, and is particularly adaptable for crates which are used for carrying or transporting well known types of milk containers, either the type known as a paper milk container or the type known as a glass milk bottle.

Crates used in the handling and transportation of milk containers are subject to rigid sanitary regulations of the various Bureaus of Health authorities, and must be of a construction which may be cleaned thoroughly and readily.

During certain periods of handling, milk container crates are stacked in tiers in the milk bottling plants; in the vehicles used for transportation of the crates; at the sales outlets where the bottled milk is sold; etc. Accordingly, it is essential from a practical commercial viewpoint, that milk container crates be of a construction as will permit them to be stacked facilely and securely one on top of the other, and remain stacked, without sliding or shifting.

In most of the larger milk bottling plants, the milk container crates are conveyed on conveyor systems of various well known types, and which may include an endless chain provided with spaced apart dogs, etc. which are adapted to engage the milk container crates to effect movement thereof along the conveyor.

One object of my invention is to provide a wire crate which has a novel stacking means at the bottom thereof by which crates may be readily and facilely stacked securely one on top of the other, with the stacking means of each crate being fitted into the open top of the crate below to prevent sliding or shifting of one crate on the other.

Another object of my invention is to provide a wire crate with a stacking member of a construction whereby the stacking member will be engaged automatically at approximately the center thereof by dogs, etc. carried on an endless chain used to move the crates along a conveyor.

Another object of my invention is to provide a wire crate with a novel stacking means which includes not only means to assure the engagement thereof at the desired point of contact by dogs, etc. carried by an endless chain, but also means to prevent abrasive wear on the bottom of the crate proper which could occur if the endless chain came into contact with the bottom of the crate proper.

Detrimental wear caused by endless chains coming in contact with the bottom of crates of the prior art has been a well known problem encountered in milk processing plants for a number of years, as well as the problem of having crates shift to a side of the conveyor means because the dogs, etc. had engaged the crate at a point other than at the approximate center line thereof.

Other features of my invention and an understanding thereof may be had from the following detailed description with reference to the accompanying drawings.

In said drawings:

Fig. 1 is a side elevation view of a wire crate embodying my invention.

Fig. 2 is an end view of the wire crate shown in Fig. 1.

Fig. 3 is a bottom view of the crate shown in Figs. 1 and 2.

Fig. 4 is a vertical sectional view of a plurality of wire crates in stacked relation, the section of each crate being shown as if taken on the line 4—4 in Fig. 1.

Fig. 5 is a vertical sectional view taken on the line 5—5 in Figs. 2 and 3, and with a dog carried by an endless chain shown in engagement with the stacking member at the centered guide recess formed therein.

Referring to said drawings; the wire crate indicated generally at 1 includes a top perimeter frame member 2 which may be formed from heavy gauge wire bent into substantial rectangular shape and conveniently welded to form a continuous perimeter. The crate 1 is provided with a bottom perimeter frame member 3 which is substantially identical with the top frame member 2. The wire crate 1 is provided with intermediate frame members 5 and 6, of the same configuration as the top and bottom frame members, which are spaced relatively with respect to each other and spaced vertically with respect to the top frame member 2 and bottom frame member 3. If desired, a lighter gauge wire may be used for the members 5 and 6.

The top frame member 2 and bottom frame member 3 are connected by a plurality of wire members 7 which, conveniently, are of general hairpin configuration. The wire members 7 are conveniently welded at their respective top connecting loops to the inside of the top frame member 2, and the vertically disposed legs of the members 7 are welded at the bottoms thereof to the inside of the bottom frame member 3. Thus, the wire members 7 maintain the wire frame members 2 and 3 in spaced apart relationship, and said members 7 also form the sides of the wire crate 1. Of course, it is obvious that the members 7 may be of any desired configuration other than the hairpin shape, as shown.

The vertically disposed legs of the plurality of wire members 7 are conveniently welded to the intermediate spaced apart wire frame members 5 and 6, which serves to provide a wire crate of greater strength.

The bottom of the crate 1 is formed, conveniently, by a plurality of longitudinally spaced apart members 10 which are welded at their opposite ends to the underside of the bottom frame wire 3. The bottom of the wire crate 1 is also provided with a plurality of wire members 12 which are spaced relatively to each other and positioned transversely to the bottom members 10. The wire members 12 are conveniently welded to the underside of the plurality of the parallel members 10, and I also find it desirable to weld the opposite ends of the wire members 12 to the bottom frame wire 3.

As best shown in Figs. 2 and 4, the two wire members 7 at the center of each end of the crate 1 are of a different configuration than the others, so as to provide a hand hold portion 13 at the center of each end portion of the top perimeter frame member 2. The two hand holds 13 at the opposite ends of the crate 1 enable the crate to be readily picked up and handled manually.

The stacking means is composed of two members 16 and 17 which are of general elongated rectangular shape and formed from heavy gauge wire. Although the members 16 and 17 may be formed with a complete perimeter, I find it desirable, as a manufacturing cost economy and to lessen the weight of the crate, to form the members 16 and 17 with an open center space at one of the sides. If desired, it is obvious that the stacking means also may be formed with a similar open center space at the outer sides of the members 16 and 17; which means that each of the members 16 and 17 then would be comprised of two U-shaped sections.

As best shown in Fig. 3, the members 16 and 17 are mounted in oppositely counterpart position on the cross members 12, and with the open space sides of the members 16 and 17 in abutting relationship at the longitudinal center line of the crate 1. The members 16 and 17 are rigidly secured to the cross members 12 at the points of contact therewith, conveniently by welding.

Each of the members 16 and 17 is formed, conveniently, with a rounded corner at the opposite ends of the open space side thereof, so that when the members 16 and 17 are mounted in abutting relationship as above described, and as best shown in Fig. 3, a centering guide notch of general rounded V-shape is formed, and with the apex of the guide notch 20 at the approximate longitudinally center line of the wire crate 1. Of course, the guide notch 20 may be formed with converging straight sides, or any other similar configuration, if desired.

As best shown in Fig. 5, one of a series of spaced apart dogs 25, or other well known crate moving means, carried by an endless chain 26 will automatically engage the stacking means at the apex of the guide notch 20. Accordingly, the propelling force always will be applied to the crate 1 at approximately the center line of the crate, and thus minimize any shifting of the crates to a side of the conveyor means, as occurs with crates of the prior art constructions.

The abutting open sides of the heavy gage wire members 16 and 17 at the center of the crate 1 protect the bottom of the crate 1 from abrasive wear and damage which could be caused by any upward movement of the chain 26 as would cause the chain 26 to strike against some of the members 10 which form the bottom of the crate 1, or to strike against the intermediate cross members 12.

The outside dimensions of the stacking means formed by the two members 16 and 17 when welded to the crate 1, as shown in Fig. 3, are such as to enable said stacking means of the crate above to fit within the upper ends of the plurality of hairpin shaped wire members 7 welded to the inside of the top perimeter frame member 2 of the crate below, and with the outer ends of the plurality of the cross members 12 of the crate above resting and supported on the top surface of the top perimeter frame member 2 of the crate below.

Thus, the upper crate will be solidly supported by the multiplicity of supports provided by the opposite outer ends of the wire members 12, and the upper crate will be prevented from sliding or shifting on the crate below because of the stacking means members 16 and 17 being positioned within the upper ends of the plurality of hairpin shaped wire members 7 of the crate below.

Although I have herein described my invention with reference to a wire crate of the type particularly adaptable for carrying or transporting paper milk containers, it is obvious that my invention may be embodied in wire crates of the type used for glass milk bottles, and which type of crate is provided with a series of cross rods, etc. forming compartments to maintain the bottles spaced apart. One form of such bottle spacing means is disclosed in Demers Patent No. 2,334,161, dated November 16, 1943.

I do not desire to limit myself to the details of construction and arrangement as herein set forth, as it is obvious that various modifications may be made therein without departing from the essential features of my invention.

I claim:

1. In a wire crate; a top perimeter frame wire; a bottom perimeter frame wire substantially identical in configuration and size with said top perimeter frame wire; a plurality of spaced apart vertical wire members rigidly secured to and interconnecting said top and bottom perimeter frame wires, said vertical wire members forming the sides of said crate; a plurality of spaced apart bottom members rigidly secured at their respective opposite ends to said bottom perimeter frame wire, said bottom members forming supporting means for articles placed in said crate; a plurality of spaced apart reinforcing wire support members positioned transversely to and in underlying engagement with said bottom members and rigidly secured thereto at points of engagement; a stacking means rigidly secured to the bottom surfaces of said reinforcing wire support members, said stacking means being comprised of two substantially identical elongated rectangular shaped members formed from wire, said rectangular shaped wire members having rounded corners and being positioned side by side with their adjacent sides at approximately the longitudinal center line of said crate, said stacking means being of slightly lesser dimensions than said top perimeter frame wire and of such dimensions as to fit within the top perimeter frame wire of a like crate below; a centering guide notch of general V-shape, adapted to be engaged by crate propelling means, formed by adjacent rounded corners of said two rectangular shaped members at the ends of the adjacent sides thereof, the apex of said guide notch being at the approximate longitudinal center line of said wire crate; whereby, when said crates are stacked, said stacking means of a crate above is positioned within the top perimeter frame wire of a like crate below and prevents the crate above from sliding off the crate below; and whereby, when said crate is on a conveyor, said stacking means may be engaged automatically at approximately the longitudinal center line of said crate by a crate propelling means carried by a driven chain positioned in the middle of the conveyor system.

2. In a wire crate; a top perimeter frame wire; a bottom perimeter frame wire substantially identical in configuration and size with said top perimeter frame wire; a plurality of spaced apart vertical wire members rigidly secured to and interconnecting said top and bottom perimeter frame wires, said vertical wire members forming the sides of said crate; a plurality of spaced apart bottom wire members rigidly secured at their respective opposite ends to said bottom perimeter frame wire, said bottom wire members forming supporting means for articles placed in said crate; a plurality of spaced apart reinforcing wire support members positioned transversely to and in underlying engagement with said bottom wire members and rigidly secured thereto at points of engagement, said reinforcing wire support members also being rigidly secured at their respective opposite ends to said bottom perimeter frame wire; a stacking means rigidly secured to the bottom surfaces of said reinforcing wire support members, said stacking means being comprised of two substantially identical elongated rectangular shaped members formed from wire, said rectangular shaped wire members having rounded corners and being positioned side by side with their adjacent sides at approximately the longitudinal center line of said crate, said stacking means being of slightly lesser dimensions than said top perimeter frame wire and of such dimensions as to fit within the top perimeter frame wire of a like crate below; a centering guide notch of general rounded V-shape, adapted to be engaged by crate propelling means, formed by adjacent rounded corners of said two rectangular shaped members at the ends of the adjacent sides thereof, the apex of said guide notch being at the approximate longitudinal center line of said wire crate; whereby, when said crates are stacked, said stacking means of a crate above is positioned within the top perimeter frame wire of a like crate below and prevents the crate above from sliding off the crate below; and whereby, when said crate is on a conveyor, said stacking means may be engaged automatically at approximately the longitudinal center line of said crate by a crate propelling means carried by a driven chain positioned in the middle of the conveyor system.

3. In a wire crate; a top perimeter frame wire; a bottom perimeter frame wire substantially identical in configuration and size with said top perimeter frame wire; a plurality of spaced apart vertical wire members rigidly secured to and interconnecting said top and bottom perimeter frame wires, said vertical wire members forming the sides of said crate; a plurality of spaced apart bottom wire members rigidly secured at their respective opposite ends to said bottom perimeter frame wire, said bottom wire members forming supporting means for articles placed in said crate; a plurality of spaced apart reinforcing wire support members positioned transversely to and in underlying engagement with said bottom wire members and rigidly secured thereto at points of engagement; a stacking means rigidly secured to the bottom surfaces of said reinforcing wire support members, said stacking means being comprised of two substantially identical elongated rectangular shaped members formed from wire, with an open space at the center of one of the sides of each elongated rectangular shaped member, said rectangular shaped wire members having rounded corners and being positioned side by side with their respective adjacent open space sides in abutting relationship at approximately the longitudinal center line of said crate, said stacking means being of slightly lesser dimensions than said top perimeter frame wire and of such dimensions as to fit within the top perimeter frame wire of a like crate below; an inwardly tapering centering guide notch, adapted to be engaged by crate propelling means, formed at the approximate center of each end of said stacking means by adjacent rounded corners of said two rectangular shaped members at the ends of the adjacent sides thereof, the apex of said guide notch being at the approximate longitudinal center line of said wire crate; whereby, when said crates are stacked, said stacking means of a crate above is positioned within the top perimeter frame wire of a crate below and prevents the like crate above from sliding off the crate below; and whereby, when said crate is on a conveyor, said stacking means may be engaged automatically at approximately the longitudinal center line of said crate by a crate propelling means carried by a driven chain positioned in the middle of the conveyor system.

4. In a wire crate; a top perimeter frame wire; a bottom perimeter frame wire substantially identical in configuration and size with said top perimeter frame wire; a plurality of spaced apart vertical wire members rigidly secured to and interconnecting said top and bottom perimeter frame wires, said vertical wire members forming the sides of said crate; a plurality of spaced apart bottom wire members rigidly secured at their respective opposite ends to said bottom perimeter frame wire, said bottom wire members forming supporting means for articles placed in said crate; a plurality of spaced apart reinforcing wire support members positioned transversely to and in underlying engagement with said bottom wire members and rigidly secured thereto at points of engagement; a stacking means rigidly secured to the bottom surfaces of said reinforcing wire support members, said stacking means being composed of two members, each member being comprised of a pair of spaced apart U-shaped wire sections having rounded corners and positioned oppositely counterpart which together form the outline of an elongated rectangular shape, the U-shaped sections comprising one member being positioned in abutting relationship along one side arm thereof with the corresponding side arm of the U-shaped sections of the other member at the approximate longitudinal center line of said crate, said stacking means being of slightly lesser dimensions than said top perimeter frame wire and of such dimensions as to fit within the top perimeter frame wire of a like crate below; an inwardly tapering centering guide notch, adapted to be engaged by crate propelling means, formed at the approximate center of each end of said stacking means by adjacent rounded corners of said abutting U-shaped sections at the ends of the adjacent abutting sides thereof, the apex of said guide notch being at the approximate longitudinal center line of said wire crate; whereby, when said crates are stacked, said stacking means of a crate above is positioned within the top perimeter frame wire of a like crate below and prevents the crate above from sliding off the crate below; and whereby, when said crate is on a conveyor, said stacking means may be engaged automatically at approximately the longitudinal center line of said crate by a crate propelling means carried by a driven chain positioned in the middle of the conveyor system.

References Cited in the file of this patent

UNITED STATES PATENTS 2,512,517    Bruce ------------------ June 20, 1950